C. BUTTERS.
APPARATUS FOR FILTERING SLIMES.
APPLICATION FILED MAY 26, 1913.
1,100,217.
Patented June 16, 1914.
3 SHEETS—SHEET 1.
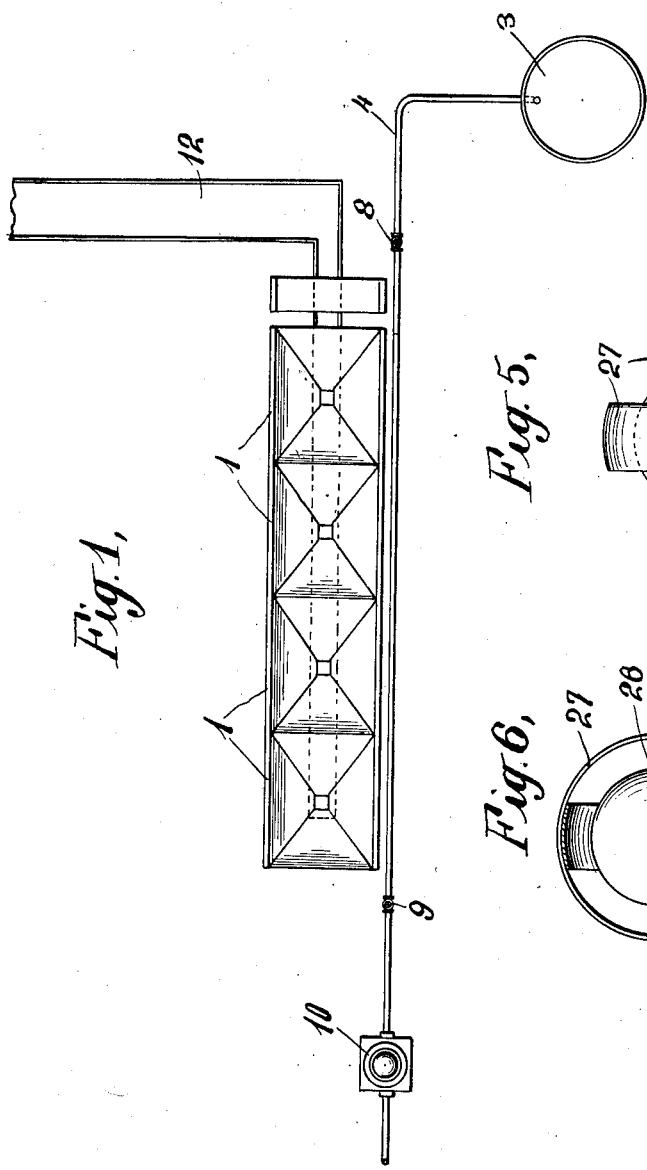
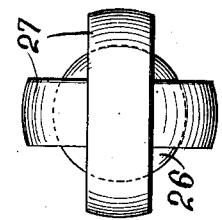
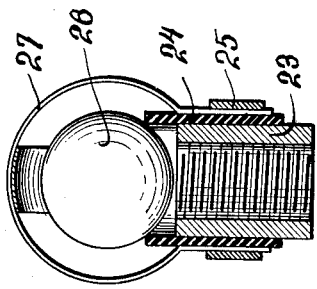
Charles Butters,
INVENTOR,
BY Kenyon & Kenyon
ATTORNEYS.

C. BUTTERS.
APPARATUS FOR FILTERING SLIMES.
APPLICATION FILED MAY 26, 1913.
1,100,217.
Patented June 16, 1914.
3 SHEETS—SHEET 2.
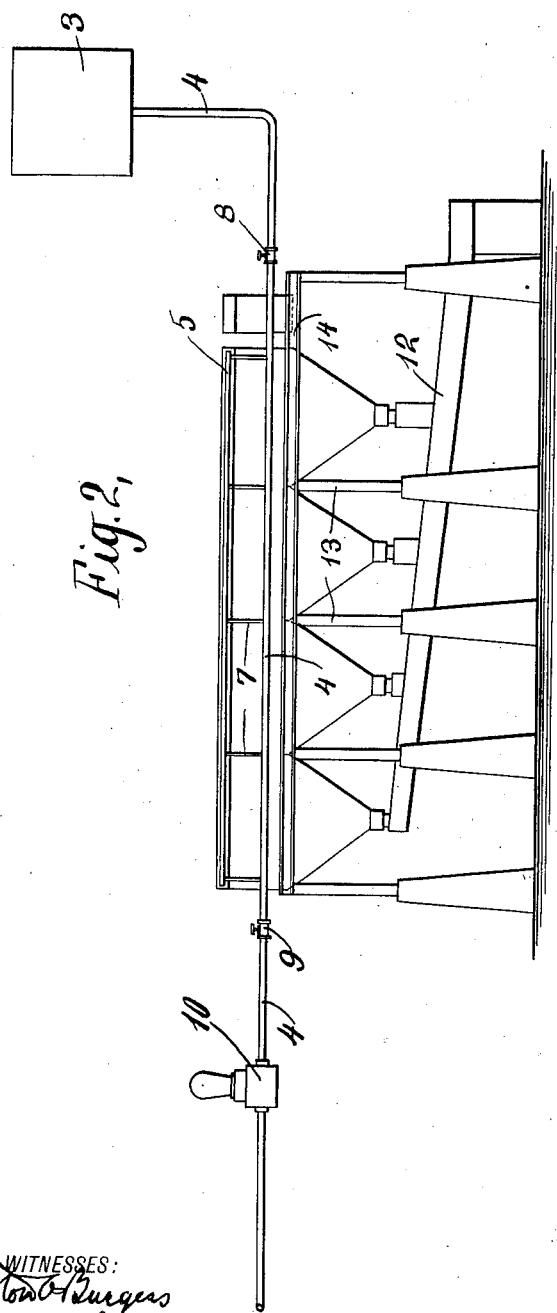
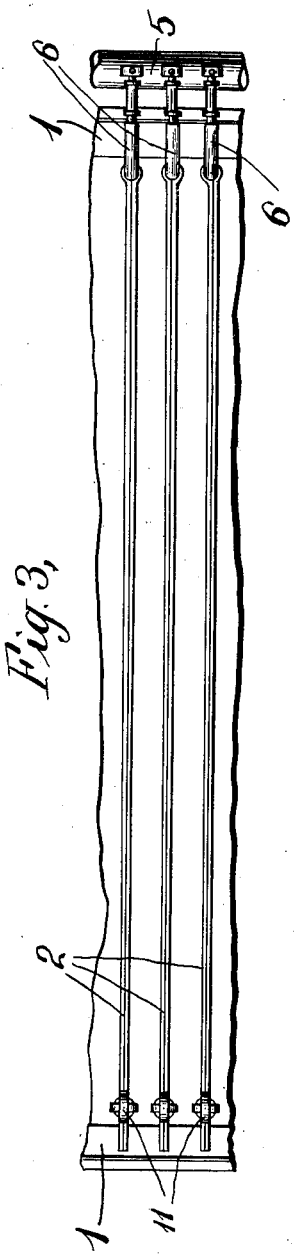

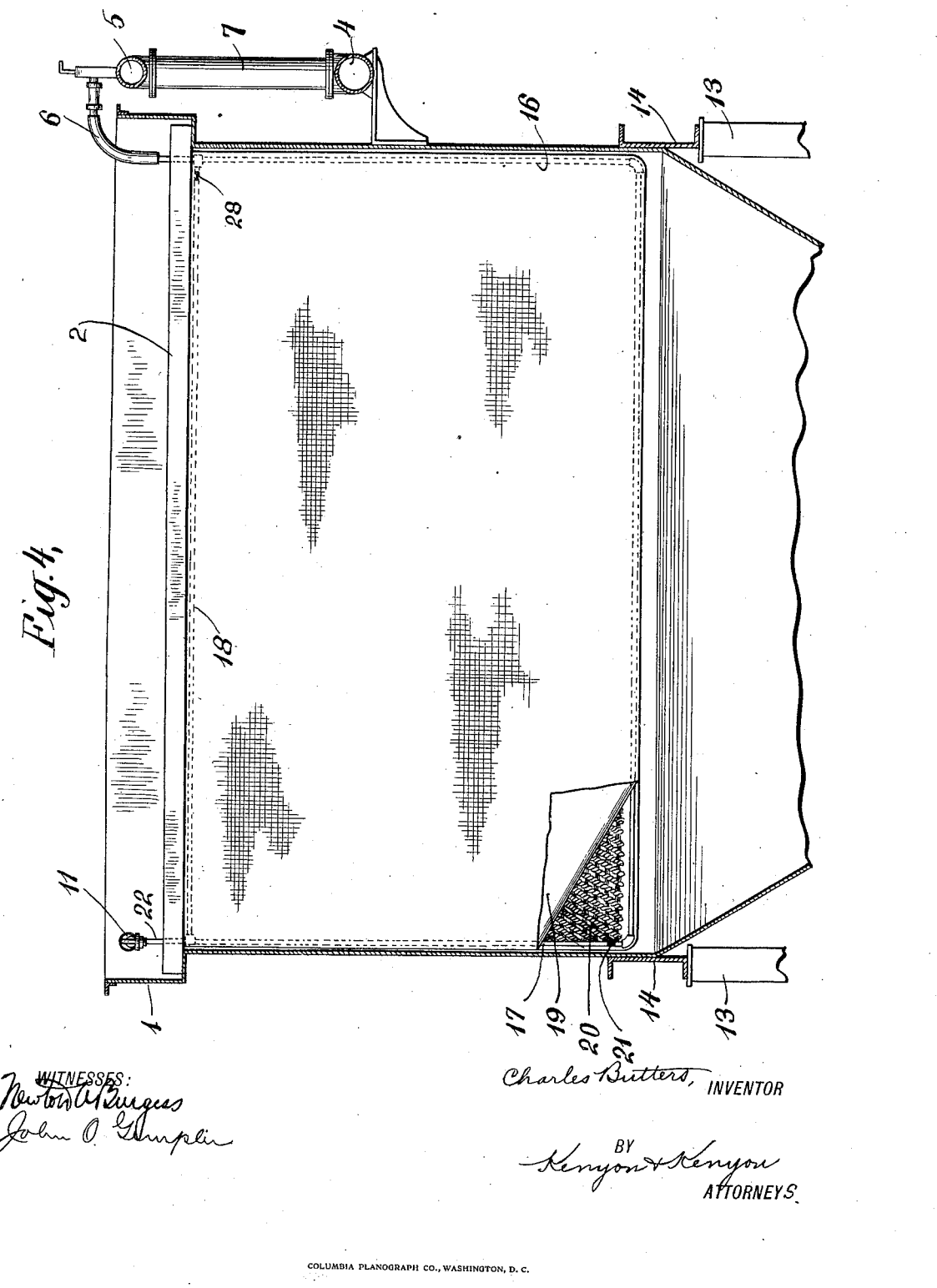

UNITED STATES PATENT OFFICE.

CHARLES BUTTERS, OF OAKLAND, CALIFORNIA.

APPARATUS FOR FILTERING SLIMES.

1,100,217. Specification of Letters Patent. Patented June 16, 1914.

Application filed May 26, 1913. Serial No. 769,779.

*To all whom it may concern:*

Be it known that I, CHARLES BUTTERS, a citizen of the United States, and a resident of Oakland, county of Alameda, State of California, have invented certain new and useful Improvements in Apparatus for Filtering Slimes, of which the following is a specification.

The object of my invention is to shorten the time taken for a cycle of operation in the process of filtering valuable compounds, such as slimes, which result from the well known cyanid process of treating ores.

Another object of my invention is to lower the cost of filter leaves while at the same time increasing their life and value.

In abstracting the values from slimes one of the most difficult and troublesome problems is to dislodge reliably and within an economical time, the slime cake from the surface of the filter medium after the filtering process has been completed, without injuring the filter surface of the leaf.

It has been the practice heretofore to dislodge slime cakes by air pressure placed on the interior of the leaves while suspended in the air, or this has been accomplished in some cases by water under pressure being passed through the filter medium in a direction reverse to that of the filtrate. It has been supposed heretofore that to dislodge the cake reliably and within an economical time, pressure was necessary whether of air, water or other fluid in the dislodging step, and special precaution has sometimes been taken to get a uniformly thick, cohesive and resistant cake deposit such that the fluid under pressure might dislodge it as an entirety and make it unnecessary to use additional means to dislodge the cake completely. By my process such uniformity of the cake is of no importance at all to the cake dislodgment, and consequently the filtering operation may be more economical.

If notable internal pressure is put on a leaf for cake-dislodgment purposes, means must be provided to prevent distension or ballooning of the filter medium. Various means have been devised to this end, all of which have added to the difficulty of cake-dislodgment. As a matter of practice, too, it is found that all such means are a hindrance to proper and economical operation; further, they shorten the life of the leaves, but have been regarded as indispensable when former practicable methods of cake-dislodgment have been used.

The efficiency of the leaves heretofore used is low, first, because a considerable amount of the filtering surface of the medium is obstructed by the means used to prevent ballooning, such as strips down the sides; and second, because of stitching the media together or by bolting strips onto the outside of the leaf to prevent ballooning, comparatively large holes are made in the media. Also, these holes make the media more liable to rupture under internal pressure, thus shortening their life.

I have discovered that pressure is unnecessary to reliable cake-dislodgment within an economical time, and that complete success can be attained by saturation of the entire area of the filter medium. It is found in practice that these cakes have unusual adhesion and cohesion, and that when a cake is formed on each side of a filter leaf they are not easily dislodged. Due to the great cohesion of the cake it is very important that the upper part, as well as the other parts, of the filter medium be saturated in the dislodging step, as it is found that the adhesion of the cake to the medium is greatly lessened, and that the time for dislodgment is materially shortened thereby. This has not been attained in leaves heretofore constructed because they contained enough air to prevent water reaching the top part thereof even when admitted under pressure. This was true in spite of the fact that the leaf might be under vacuous conditions at the time the water was first admitted. I have therefore devised a leaf which may or may not have internal pressure applied thereto during the dislodging step, but I do not depend upon internal pressure to dislodge the cake, since by my invention the cake can be dislodged without internal pressure. It is understood that the cake may be, and preferably is, dislodged while the leaf is submerged in wash water. This means that there will be considerable hydrostatic pressure on the outside of the leaf. This is or may be balanced by the hydrostatic pressure on the inside of the leaf.

The principal advantages of my improved leaf over previous ones are: First, under otherwise similar conditions it dislodges its cake in a shorter time; and secondly, it is a more efficient filter. The above advantages are attributed to the fact that substantially the entire surface of the leaf is saturated during the dislodging step because the air is permitted to escape through the relief valve and as there need never be high internal pressure no means are required to prevent ballooning; therefore, the surface may be smooth, being clear of all manner of bracing, stitching or other surface-roughening means which have heretofore been necessary to prevent ballooning, and consequently the cake is more easily dislodged.

Other advantages will be apparent from the following detailed description taken in connection with the accompanying drawings, in which—

Figure 1 shows a diagrammatic plan view of a general layout showing a clean water source and piping for supplying the water to the leaves; Fig. 2 is a side elevation of the devices shown in Fig. 1; Fig. 3 is a plan of a portion of a vat with several leaves therein; Fig. 4 is a view of a leaf embodying my invention; Fig. 5 is a plan view of a relief valve; and Fig. 6 is a section of a relief valve.

In Fig. 1 are shown a plurality of vats 1 in which the leaves 2 are placed as shown in Fig. 3. These leaves are connected with the clean water source 3 by means of the piping 4 and 5 through any suitable connection 6 such as a rubber elbow. In order that the water may reach all the leaves quickly the pipe 5 is arranged along the top of the vats and is connected with the pipe 4 from the water supply by means of risers 7. In pipe 4 are placed valves 8 and 9 so that a portion of the pipe 4 and the pipe 5 may be used both for conducting the filtrate from the leaves during the filtering operation, and also for supplying the clean cake-dislodging water at the proper time. The pump 10 is shown connected with the pipe 4 for the purpose of creating a vacuum within the leaves during the filtering operation.

When it is desired to begin the filtering operation valve 8 is closed and pump 10 started to decrease the pressure within the filter leaves and thereby draw a filtrate through and form a cake on the surface of the filtering medium. When sufficient cake has been formed, it may be treated in well known ways with barren solution and then with wash water, and it is then ready to be dislodged. The valve 9 is then closed and valve 8 is opened thereby permitting the water to run into the leaves from the tank 3 through the piping 4, risers 7, pipes 5 and 6, thus filling the leaves and causing the cakes, within four or five minutes, to drop. The air contained in the leaves is discharged through the relief-valves 11. The thick slime is then run out from the bottom of the vats into the run-way 12, and thence to the slime-pit. The vats may be properly supported by any convenient means such as the pillars 13 and I-beams 14, shown in Fig. 4.

As shown in Fig. 4 the leaf comprises a frame having members 15, 16, 17 and 18, preferably of tubing. Over this frame is secured a filtering medium 19 of canvas or other suitable material. Inside the filter-leaf is a fibrous filler 20 preferably of cocoa mat, for holding the sides thereof apart when vacuum is created within the leaf. The lower frame member 15 is perforated or slotted along its upper side and is connected to a vacuum pump 10, or other pressure-decreasing means through the right-hand end member 16 and the connection 6 which may be of rubber or other suitable material. The filtrate is removed from the leaf by means of the pump 10. The left-hand frame member 17 is plugged by any suitable means such as a wooden plug shown at 21 in Fig. 1. The top frame member 18 is perforated or slotted along its lower side and to this member is attached the relief-valve 11. This member is also plugged as shown at 28, and is rigidily connected to the right hand end member to make a rigid frame structure. It is not necessary that the relief valve be connected to the frame member, but this arrangement is preferred and it is so illustrated in the drawings. The pipe 22 connecting the valve to the leaf may be of any suitable length. The relief valve 11 should be connected to the upper portion of the leaf in order to allow the escape of air, but it may be connected to any point of the leaf to prevent internal pressure if this alone is desired.

The preferred form of relief valve is shown in detail in Figs. 5 and 6, but it is obvious that other kinds of valve may be used provided it allows exit but prevents entrance of air. The valve hereafter described is by way of example only and must not be considered as limiting my invention. As shown in Figs. 5 and 6, the relief-valve consists of a pipe-coupling 23 around which is securely clamped a rubber tube 24 the upper end of which acts as a valve seat. This tube is clamped around the coupling 23 by a band 25 in any well known manner. Arranged to coöperate with the seat 24 is a ball 26 of rubber. For the purpose of confining the movement of the ball, guards 27 are placed around same, as clearly shown in the drawing.

It will be readily understood that by the use of a valve of the kind above described, the entrance of air will be entirely prevented when vacuum is created within the leaf, thereby not interfering in any way with the filtering properties of the leaf. As soon as vacuum is relieved, the elasticity of the seat will push the ball up, and due to unavoidable irregularities, small passages will exist between the ball and its seat sufficient to allow the escape of whatever air remains in the leaf as water is admitted thereto. By this arrangement the air may be easily displaced by water when the latter is admitted to the leaf so that it can saturate the entire surface of the filter media and cause a rapid dislodgment of the cake. The water for this purpose is supplied from any suitable supply 3 through the connection 6, frame member 16 and perforated frame member 15 into the bottom of the leaf.

In Fig. 3 is illustrated a series of leaves 2 placed on the sides of a vat, 1.

The operation of my device is as follows: The leaf is completely submerged, care being taken not to allow slimes to enter the relief-valve. Suction is applied to the interior by any means, such as a vacuum-pump, and the filtrate is carried off by the pressure-decreasing means. As soon as the internal pressure is decreased the relief-valve closes tight so as to completely prevent the entrance of air. The suction is continued until a cake of proper thickness is deposited on the filter surface. This cake may then be variously treated with barren solution and wash water, and then the vacuum is turned off and water is conducted into the bottom frame member 15, the leaf being still submerged or not as desired. As the water rises in the leaf, the air passes out through the relief-valve so that the water rises to the top of the leaf and completely fills it and so saturates the entire surface of the filter media, thereby causing the cake to be rapidly dislodged. The water may be delivered into the leaf either under pressure or not with satisfactory results. If it is delivered under some pressure it spouts out through the relief-valves and carries with it all entrapped air from inside the leaf and consequently more effectively saturates the entire filter surface. One advantage of having the water under pressure is that the air is expelled quickly and also the leaf is filled up with water quickly. When the filter surface is saturated the cake is automatically and quickly dislodged and the surface of the filter medium is cleansed and ready for another cycle.

Having described my invention, what I claim as new, and desire to secure by Letters Patent, is:—

1. A suction filter leaf having means for admitting water thereinto to dislodge a cake therefrom, and a relief valve in communication with the upper portion thereof to relieve said leaf of air as water is admitted thereto.

2. A suction filter leaf comprising a frame having passages in the upper member thereof, a relief valve connected with said passages, and means for admitting water to the interior of said leaf.

3. A suction filter leaf comprising a frame, a filter medium carried by said frame, a relief valve connected with the upper part of said leaf for relieving said leaf of air as water is admitted thereto, and a water supply connected with the interior of said leaf.

4. A suction filter leaf comprising a frame, a filter medium carried by said frame, a relief valve connected to the upper portion of said leaf for relieving said leaf of air as water is admitted thereto, and a water supply connected to the lower portion of said leaf.

5. A suction filter leaf comprising a frame having passages in members thereof, a filter medium carried by said frame, a relief valve for relieving said leaf of air connected with the top frame member, and a water supply connected with the lower frame member, the passages in said members communicating with the interior and exterior of said leaf.

6. A suction filter leaf comprising a frame, a filter medium carried by said frame, an automatic air relief valve connected to said leaf, and an elevated water supply connected to said leaf, whereby the air in said leaf is totally displaced by water and the cake is dislodged therefrom.

7. In a suction filter leaf, the combination of a frame having passages communicating with the interior and exterior of said leaf, and automatic means for discharging air from said leaf and permitting water to completely fill said leaf to saturate the filter medium for dislodging the cake from said medium.

8. In a filter leaf, means preventing internal pressure exceeding external pressure thereof while the cake is being dislodged from said leaf.

9. In a filter leaf, automatic means preventing excess of internal over external pressure thereof while the cake is being dislodged from said leaf.

10. In a filter leaf, a check valve preventing internal pressure therein while the cake is being dislodged from said leaf.

11. A filter leaf comprising a frame, filter media carried by said frame, means limiting the inward movement of said media under differing pressure conditions, and means governing water pressure conditions within said leaf.

12. A filter leaf comprising a frame, filter media carried by said frame, an exit for filtrate from said leaf, and an automatic valve determining the maximum internal water pressure of said leaf.

13. A filter leaf comprising a frame, filter media carried by said frame, an exit for filtrate from said leaf, and a valve determining the maximum internal water pressure of said leaf.

14. A filter leaf comprising a frame having passages in members thereof, filter media carried by said frame, fibrous means for limiting the proximity of said media to each other, means for decreasing the pressure within said leaf, and means preventing water pressure therein during cake dislodging.

15. A filter leaf comprising a frame having passages in members thereof, filter media carried by said frame, means holding said media in place, and means for preventing a greater internal than external water pressure in said leaf.

16. A filter leaf comprising a frame having passages in the bottom member thereof, means connected with said passages for decreasing the pressure in said leaf, and means limiting the internal water pressure of said leaf and permitting the exit and preventing entrance of air in said leaf.

In testimony whereof, I have signed my name to this specification, in the presence of two subscribing witnesses.

CHARLES BUTTERS.

Witnesses:
A. GOWEN,
D. BELL.

Copies of this patent may be obtained for five cents each, by addressing the "Commissioner of Patents, Washington, D. C."